(12) United States Patent
Jin et al.

(10) Patent No.: US 10,146,994 B2
(45) Date of Patent: Dec. 4, 2018

(54) METHOD AND APPARATUS FOR GENERATING TEXT LINE CLASSIFIER

(71) Applicant: Alibaba Group Holding Limited, George Town, Grand Cayman (KY)

(72) Inventors: Xuan Jin, Hangzhou (CN); Tianzhou Wang, Hangzhou (CN); Qin Xue, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/080,047

(22) Filed: Mar. 24, 2016

(65) Prior Publication Data

US 2016/0283814 A1    Sep. 29, 2016

(30) Foreign Application Priority Data

Mar. 25, 2015    (CN) .......................... 2015 1 0133507

(51) Int. Cl.
*G06K 9/00* (2006.01)
*G06K 9/62* (2006.01)
*G06K 9/68* (2006.01)

(52) U.S. Cl.
CPC ........... *G06K 9/00456* (2013.01); *G06K 9/00* (2013.01); *G06K 9/00865* (2013.01);
(Continued)

(58) Field of Classification Search
CPC .... G06K 2209/01; G06K 9/342; G06K 9/344; G06K 9/346; G06K 9/00442; G06K 9/00422; G06K 9/00288; G06K 9/00463; G06K 9/00577; G06K 9/4604; G06K 9/4671; G06K 9/6297; G06K 9/00456; G06K 9/3283; G06K 9/348; G06K 9/6255; G06K 9/66; G06K 9/6828; G06K 2209/013; G06K 9/00865; G06K 9/68; G06K 9/6821; G06K 9/3258; G06K 9/00449; G06K 9/00818; G06K 9/6261; G06F 17/30253; G06F 17/241; G06F 17/2217; H04L 12/585; H04L 51/12; G10L 15/14;
(Continued)

(56) References Cited

U.S. PATENT DOCUMENTS 3,701,972 A * 10/1972 Berkeley ............... G06F 9/4843
709/248
4,162,482 A 7/1979 Su
(Continued)

*Primary Examiner* — Aklilu Woldemariam

(57) ABSTRACT

A method of generating a text line classifier including generating text line samples by use of a present terminal system font reservoir. The method also includes extracting features from the text line samples and pre-stored marked-up samples. The method further includes training models by use of the extracted features to generate a text line classifier for recognizing text regions. With the system font reservoir being utilized for generating text line samples, the generated text line classifiers can target different scenes or different requirements for text region recognition with a high degree of applicability and wide application in addition to ease of implementation. Together with the combinational use of the marked up samples for extracting features from the text line samples, the generated text line classifiers provide for enhanced classification efficiency and accuracy.

11 Claims, 7 Drawing Sheets

(52) U.S. Cl.
CPC ......... *G06K 9/6255* (2013.01); *G06K 9/6821*
(2013.01); *G06K 2209/013* (2013.01)

(58) Field of Classification Search
CPC ...... G06T 7/11; H04N 1/00331; G06N 5/025;
G06N 7/005; G06N 99/005
USPC ....... 382/161, 171, 182, 176, 165, 187, 229,
382/159
See application file for complete search history.

(56) References Cited

U.S. PATENT DOCUMENTS

| | | | |
|---|---|---|---|
| 5,031,225 A | 7/1991 | Tachikawa et al. | |
| 5,583,949 A * | 12/1996 | Smith | G06K 9/481 382/199 |
| 5,594,809 A * | 1/1997 | Kopec | G06K 9/6297 382/161 |
| 5,734,388 A * | 3/1998 | Ristow | G06K 15/02 345/469 |
| 5,754,187 A * | 5/1998 | Ristow | G06K 15/02 345/469 |
| 5,757,960 A * | 5/1998 | Murdock | G06K 9/68 382/187 |
| 5,956,419 A * | 9/1999 | Kopec | G06K 9/68 345/467 |
| 6,426,751 B1 * | 7/2002 | Patel | G06F 17/214 345/468 |
| 7,606,408 B2 | 10/2009 | Takiuguchi | |
| 7,689,037 B2 | 3/2010 | Handley et al. | |
| 7,783,969 B1 | 8/2010 | Menninga | |
| 7,809,192 B2 * | 10/2010 | Gokturk | G06F 17/30253 382/176 |
| 7,860,312 B2 | 12/2010 | Handley et al. | |
| 7,869,578 B2 | 1/2011 | Evans et al. | |
| 7,945,627 B1 | 5/2011 | Musat | |
| 7,965,891 B2 | 6/2011 | Handley | |
| 8,051,139 B1 | 11/2011 | Musat | |
| 8,065,379 B1 | 11/2011 | Musat | |
| 8,131,756 B2 | 3/2012 | Carus et al. | |
| 8,150,160 B2 | 4/2012 | Al-Muhtaseb et al. | |
| 8,218,875 B2 | 7/2012 | Al-Omari et al. | |
| 8,311,331 B2 | 11/2012 | Nijemcevic et al. | |
| 8,385,652 B2 | 2/2013 | Mitic | |
| 8,509,534 B2 | 8/2013 | Galic et al. | |
| 8,526,732 B2 | 9/2013 | Galic et al. | |
| 8,532,386 B2 | 9/2013 | Umeda et al. | |
| 8,588,529 B2 | 11/2013 | Nykyforov | |
| 8,594,422 B2 | 11/2013 | Cimpoi et al. | |
| 8,768,059 B2 | 7/2014 | Mitic | |
| 8,818,033 B1 | 8/2014 | Liu et al. | |
| 8,837,830 B2 | 9/2014 | Bala et al. | |
| 8,849,031 B2 | 9/2014 | Handley | |
| 8,908,999 B2 | 12/2014 | Ishihara et al. | |
| 8,924,391 B2 | 12/2014 | Johnston et al. | |
| 8,977,057 B1 | 3/2015 | Smith | |
| 9,070,035 B2 | 6/2015 | Pan et al. | |
| 9,076,056 B2 | 7/2015 | Wang et al. | |
| 9,135,348 B2 | 9/2015 | Wu et al. | |
| 9,183,636 B1 | 11/2015 | Collet et al. | |
| 2004/0102245 A1 * | 5/2004 | Escalera | G07F 17/3211 463/32 |
| 2006/0056696 A1 | 3/2006 | Jun et al. | |
| 2006/0251292 A1 * | 11/2006 | Gokturk | G06F 17/30253 382/103 |
| 2006/0251338 A1 * | 11/2006 | Gokturk | G06F 17/30253 382/305 |
| 2007/0065003 A1 | 3/2007 | Kellerman et al. | |
| 2007/0288844 A1 * | 12/2007 | Zingher | G06T 11/60 715/210 |
| 2008/0002916 A1 | 1/2008 | Vincent et al. | |
| 2010/0150448 A1 * | 6/2010 | Lecerf | G06F 17/3061 382/190 |
| 2010/0153318 A1 * | 6/2010 | Branavan | G06F 17/241 706/12 |
| 2010/0299149 A1 * | 11/2010 | Kurzweil | G10L 13/00 704/260 |
| 2010/0310172 A1 * | 12/2010 | Natarajan | G06K 9/00865 382/187 |
| 2011/0222769 A1 * | 9/2011 | Galic | G06K 9/00456 382/173 |
| 2011/0243444 A1 * | 10/2011 | Mitic | G06K 9/342 382/176 |
| 2011/0288861 A1 * | 11/2011 | Kurzweil | G09B 5/06 704/235 |
| 2012/0223889 A1 * | 9/2012 | Medlock | G06F 3/04883 345/168 |
| 2012/0237116 A1 * | 9/2012 | Xiao | G06K 9/6257 382/159 |
| 2013/0322757 A1 | 12/2013 | Pan et al. | |
| 2013/0330004 A1 | 12/2013 | Bala et al. | |
| 2014/0023271 A1 | 1/2014 | Baheti et al. | |
| 2014/0279738 A1 * | 9/2014 | Mahler | G06N 99/005 706/12 |
| 2014/0295384 A1 * | 10/2014 | Nielson | A61B 5/162 434/157 |
| 2014/0297256 A1 * | 10/2014 | Rogowski | G06F 17/289 704/2 |
| 2015/0055857 A1 * | 2/2015 | Wang | G06K 9/18 382/165 |
| 2015/0269431 A1 * | 9/2015 | Haji | G06K 9/00879 382/186 |
| 2016/0026899 A1 * | 1/2016 | Wang | G06T 7/11 382/176 |
| 2016/0283814 A1 * | 9/2016 | Jin | G06K 9/00456 |

* cited by examiner

METHOD AND APPARATUS FOR GENERATING TEXT LINE CLASSIFIER

CROSS REFERENCE TO RELATED APPLICATION

This application claims benefit to Chinese Patent Application No. 201510133507.9, filed on Mar. 25, 2015, which is incorporated herein by reference in its entirety.

TECHNICAL FIELD

The present invention relates generally to model based recognition, and more particularly to a method and apparatus for generating text line classifiers.

BACKGROUND

Currently, numerous pictures such as the pictures posted on the taobao.com web site include a large amount of prohibited texts. In order to recognize prohibited texts, optical character recognition (OCR) for natural scene images are utilized to detect and locate texts, the result of which is to filter out non-textual items and to present candidate textual items to an apparatus for recognition to enhance the accuracy of character recognition.

The natural scene OCR technology has been a hot topic in both industrial and academic research. Targeting different languages, features and algorithm structures utilized by OCR technology vary. Currently, the international OCR technology mainly targets English language. However, compared to English characters, Chinese characters are more complex and there are more types of Chinese characters. Together with the Chinese characters' component radicals rendering a single Chinese character a discontinuous region, it has been found more difficult to recognize Chinese characters.

Currently, there are three major types of OCR techniques recognizing text regions of Chinese characters in natural scenes. The first type utilizes experience based thresholds to classify. The second type extracts Chinese text line experience features from a large amount of samples marked-up in different application scenes, and utilizes a support vector machine (SVM) or the like to classify. The third type relies on a larger amount of marked-up positive samples and negative samples, and utilizes convolutional neural network (CNN) trained classifiers to classify.

With existing OCR techniques for recognizing Chinese text regions, the experience threshold based classification approach is the simplest, where the determination features mostly come from character features obtained from single character detection and extraction. But, the accuracy and robustness of such algorithms are relatively low, easily causing the effect of over-fitting. The second classification approach is presently the mainstream scheme; while the practice of the third approach is not often done due to the fact that the CNN approach tends to consume excessive amount of computational resources, affecting the overall efficiency of the algorithm. However, for either the second approach or the third approach, a large number of samples need to be marked up, consuming lots of effort and cost. Further, given that the classification results depend on the feature extraction and sample selection, for different application requirements, new batches of business dependent data need to be marked up, e.g., new samples need to be created. In other words, present marked-up samples have low applicability. In addition, Chinese characters have many fonts and styles, including the traditional, simplified and handwritten, etc., forms. Consequently, Chinese text lines have an extremely rich variety, which undoubtedly increases the difficulty in terms of recognizing Chinese text regions.

Therefore, there exists a need to provide a method of Chinese OCR text region recognition with high degrees of applicability, simplicity and effectiveness.

SUMMARY

The embodiments of the present disclosure address solutions to the above described technical problems. A first goal of the embodiments of the present disclosure is to provide for a method to generate text line classifiers, which can target different scenes or different requirements for text region recognition with a high degree of applicability and with wide application in addition to ease of implementation. The second goal of the present disclosure is to provide for an apparatus and method for generating text line classifiers.

According to an exemplary embodiment of the present disclosure, a method of generating text line classifiers includes generating text line samples by use of a present terminal system font reservoir and extracting features from the text line samples and pre-stored marked-up samples. The method further includes training models by use of the extracted features to generate a text line classifier for recognizing text regions.

According to another exemplary embodiment of the present disclosure, an apparatus for generating text line classifiers includes a generating module, an extracting module and a training module. The generating module is configured to generate text line samples by use of a present terminal system font reservoir. The extracting module is configured to extract features from the text line samples and pre-stored marked-up samples. The training module is configured to train models by use of the extracted features to generate a text line classifier for recognizing text regions.

With the system font reservoir being utilized for generating text line samples, the generated text line classifiers can target different scenes or different requirements for text region recognition with a high degree of applicability and wide application in addition to ease of implementation. Together with the combinational use of the marked up samples for extracting features from the text line samples, the text line classifiers generated provide for enhanced efficiency and accuracy in classification.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-6. However, those skilled in the art will readily appreciate that the detailed description given herein with respect to these figures is for explanatory purposes as the disclosure extends beyond these limited embodiments.

Figures 1A, 1B, 1C:
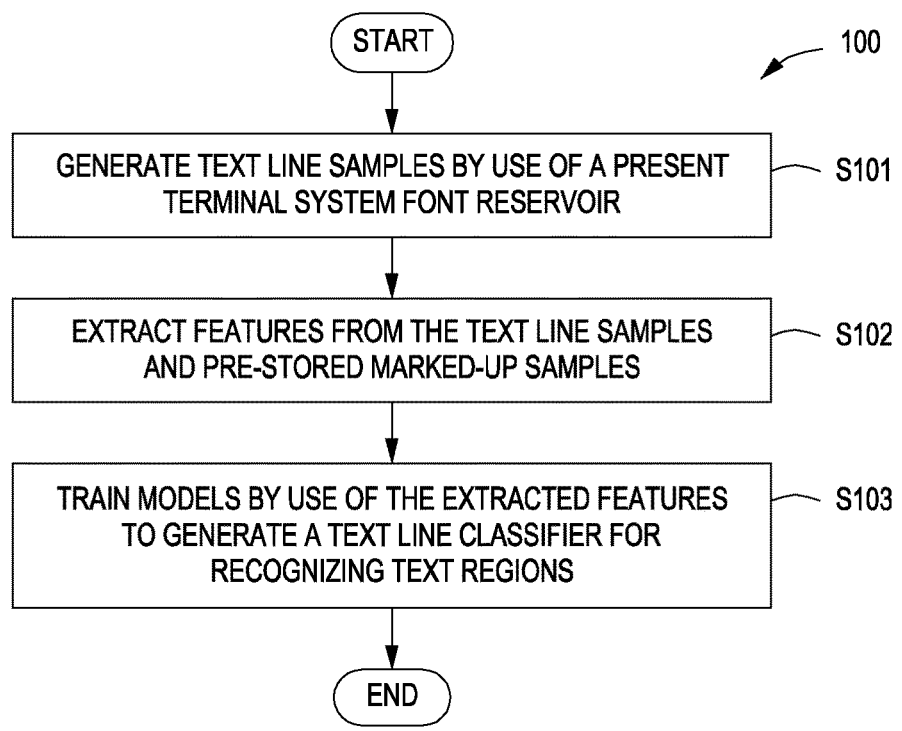
FIG. 1A is a flow chart of a first exemplary method of generating text line classifiers in accordance with an embodiment of the present disclosure.
FIG. 1B is an illustration of an exemplary single character sample utilized in an embodiment of the present disclosure.
FIG. 1C is an illustration of an exemplary text line sample utilized in an embodiment of the present disclosure.

Referring to FIG. 1A, a flow chart of an exemplary method of generating a text line classifier is shown in accordance with embodiments of the present disclosure. Method 100 starts in step S101, where a present terminal system font reservoir is utilized to generate samples of text lines. In this embodiment, the utilization of a present terminal system font reservoir to generate text line samples includes generating samples of characters using the present terminal system font reservoir, after which the samples of characters are further processed to generate various types of text line samples.

In particular, the step of generating character samples by use of the present terminal system font reservoir includes obtaining characters of different fonts from the font reservoir, and introducing spacing distance, rotation angles, size, noise and the like (disturbance) to generate character samples. Further processing of the character samples to generate text line samples includes randomly arranging characters of the same font together, followed by adding disturbance to generate text line samples of different types.

Referring to FIG. 1B, an illustration of an exemplary single character is shown in accordance with embodiments of the present disclosure. As shown here, after being obtained from the above described system font reservoir, an exemplary single character is generated after different disturbances are introduced to the character. As shown in FIG. 1C, an exemplary text line sample is generated based on the character samples.

Referring back to FIG. 1A, in step S102, features are extracted from the text line samples and the pre-stored marked up samples. In this embodiment, prior to extracting features from the text line samples and pre-stored marked up samples, the marked up samples are recorded. In particular, detection algorithms can be utilized to dissect candidate text regions, which are marked up manually, for example, as either 1 or 0 to indicate whether a region is a text region.

After the generation of the text line samples and the storage of the marked up samples, features can be extracted from those samples. In particular, one or more of the features, such as, gradient orientation histogram, gradient magnitude histogram, pixel histogram and pixel variance can be extracted from the pictures or images corresponding to the text line samples. Further, the continuous regions of the text line samples and the marked up samples can be obtained; the features of those continuous regions are also extracted accordingly. In other words, embodiments of the present disclosure provide for extracting at least two features, e.g., a group of features to facilitate generating the text line classifiers.

In step S103, models are trained by use of the extracted features to generate text line classifiers for recognizing text regions. In this embodiment, a back propagation (BP) neural network is utilized for single model training by use of the extracted features. Since each type of text line samples can train a correspondent model, various types of text line samples train various models; each model can be designated as a decision tree. In the beginning, a weight is assigned for each decision tree, then weight training is performed for the decision trees by use of a portion of the marked up samples such that each decision tree is assigned an appropriate weight to assure the accuracy of the classification. With the above described process, text line classifiers can be generated and the text line classifiers are utilized for recognizing text regions, based on the result of which pictures or images, containing prohibited texts, can be recognized.

Here, in one embodiment, features extracted from a text line sample can be represented with a vector, e.g., a picture corresponding to a text line sample can generate a 1 dimensional vector X. For all the text line samples, a set of vectors $\{X_{(i)}\}$ can be generated. The process of model training, based on all the text line samples, can be performed by inputting the vectors to the BP neural network for training to obtain training a model Model (X), which is a text line classifier.

The process of utilizing the above described text line classifiers to recognize text regions can include obtaining a feature vector Y for a candidate picture to be recognized, and then inputting the feature vector Y to a training model (e.g., a text line classifier), which outputs a score (score=Model (Y)). If the score is greater than a pre-determined value then it is determined that the candidate text region is a text line. Otherwise, it is determined that the candidate text region is a background image.

With the system font reservoir being utilized for generating text line samples, the features being extracted from the generated text line samples and the pre-stored marked up samples, the text line classifiers generated by model training based on the extracted features can target different scenes or different requirements for text region recognition with a high degree of applicability and with wide application in addition to ease of implementation. Together with the combinational use of the marked up samples for extracting features from the text line samples, the text line classifiers generated provide enhanced classification efficiency and accuracy.

Figure 2A:
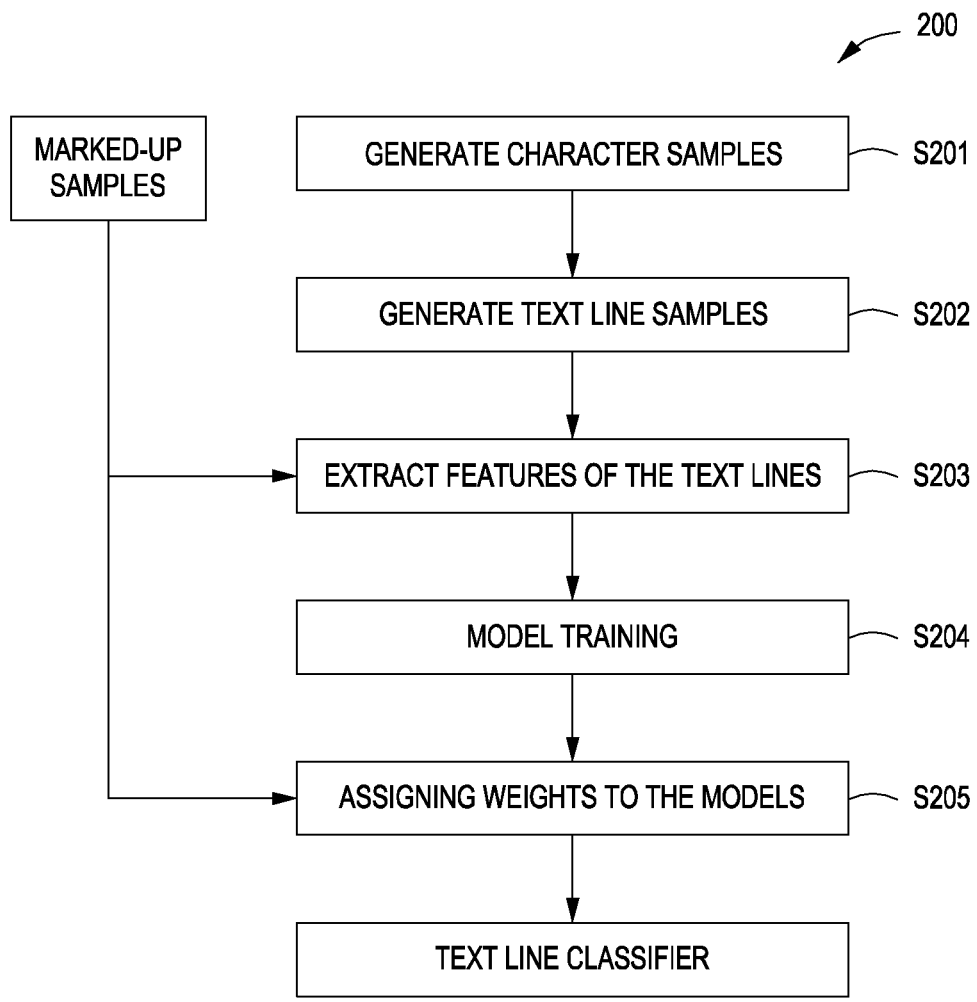
FIG. 2A is a flow chart of an exemplary method of generating text line classifiers in accordance with an embodiment of the present disclosure.

Referring to FIG. 2A, a flow chart of an exemplary method of generating text line classifiers is shown in accordance with embodiments of the present disclosure. Method 200 starts in step S201, where character samples are generated by use of a present terminal system font reservoir. For example, the character samples can be Chinese character samples, but could be any language.

Figure 2B:
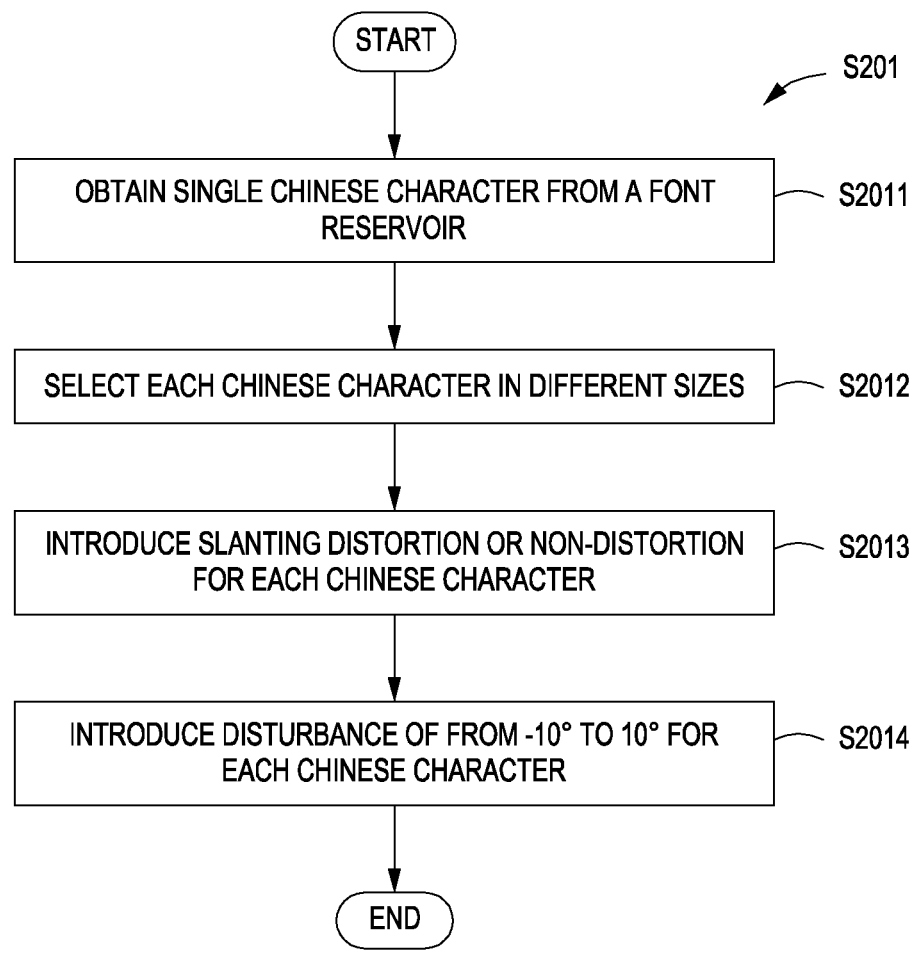
FIG. 2B is a flow chart of an exemplary method of generating character samples in accordance with an embodiment of the present disclosure.

Referring to FIG. 2B, a flow chart of an exemplary method of generating character samples is shown in accordance with embodiments of the present disclosure. Here, the generating of character samples by use of the present system font reservoir, e.g., step S201, includes the steps S2011 through S2014. In step S2011, a single character is obtained from a font reservoir, which can be the Windows™ system's embedded fonts, the Founder fonts, and/or the handwritten fonts, etc. In step S2012, each Chinese character is selected in 21 sizes, e.g., {5,5.5,6,6.5,7,7.5,8,9,10,10.5,11,12,14,16,18,20,22,24,26,28,36,48,72} (pounds). In step S2013, each Chinese character is subject to slanting distortion and non-distortion. In step S2014, each Chinese character is disturbed by rotation degrees of from about −10° to about 10°. With the above described process, sample Chinese characters and variations thereof are generated.

Figure 2C:
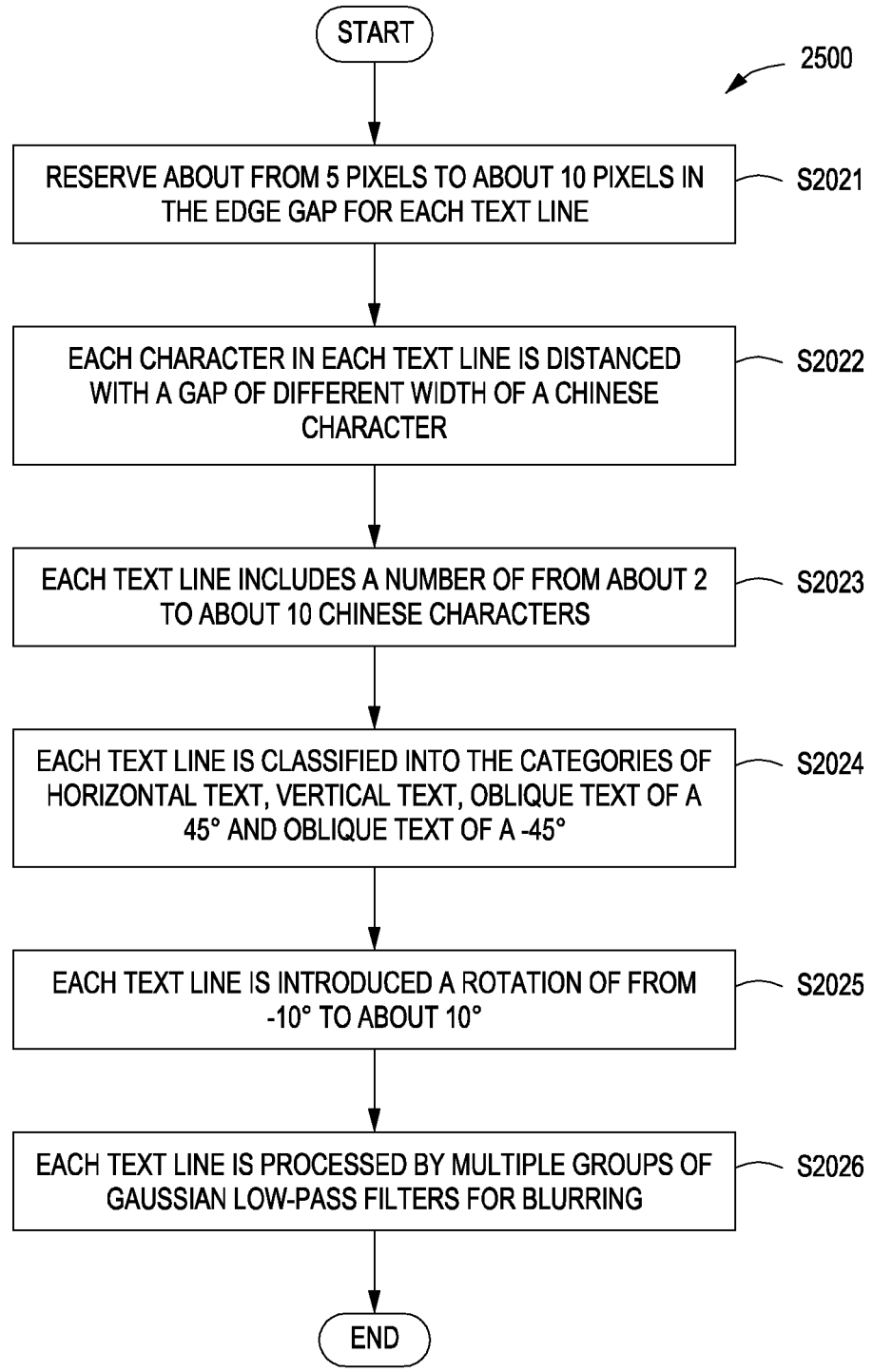
FIG. 2C is a flow chart of an exemplary method of generating text line samples by use of character samples in accordance with an embodiment of the present disclosure.

Referring back to FIG. 2A, in step S202, text line samples are generated by use of the character samples. An exemplary method of generating text line samples is shown in FIG. 2C in accordance with embodiments of the present disclosure. Method 2500 includes steps S2021 through S2026. In step S2021, each text line reserves about from 5 pixels to about 10 pixels in the edge gap. In step S2022, each character in each text line is distanced with a gap of {1,2, . . . , 10}/10 of a width of a Chinese character. In step S2023, each text line includes a number of from about 2 to about 10 Chinese characters. In step S2024, each text line is classified into the categories of horizontal text, vertical text, oblique text of a 45° and oblique text of a −45°. In step S2025, each text line is introduced a rotation of from −10° to about 10°. In step S2026, each text line is processed by multiple groups of Gaussian low-pass filters for blurring or smoothing. With the above described steps, text line samples are generated accordingly. However, further limitations can be met by the generated text line samples. For example, each text line contains Chinese characters of the same size; each sample text line contains Chinese characters of the same rotation angles; each sample text line contains Chinese characters of either the oblique style or the non-oblique style; each sample text line contains Chinese characters of the same font; and each sample text line contains commonly used Chinese characters in a percentage of, for example, above 80%.

Referring back to FIG. 2A, in step S203, features are extracted from the text line sample in combination with the pre-stored marked up samples. In particular, step S203 extracts: 1) one or more of the features of one or more of the gradient orientation histogram, gradient magnitude histogram, pixel histogram and pixel variance from the pictures corresponding to the text line samples; and 2) features of the continuous regions obtained from the text line samples and the marked up samples. The following describes those in detail.

A) Gradient orientation histogram feature.

This feature is computed with the formula:

$$\theta(x, y) = \arctan\left(\frac{d_y(x, y)}{d_x(x, y)}\right),$$

where $d_x(x, y) = p(x+1, y) - p(x, y)$ and $d_y(x, y) = p(x, y+1) - p(x, y)$. $p(x, y)$ is the pixel value corresponding to the pixel position, $d_x$ is the gradient along the X orientation of the corresponding pixel position, and $d_y$ is the gradient along the Y orientation of the corresponding pixel position.

B) Gradient magnitude histogram feature.

This feature can be computed with the formula:

$$Gv(x, y) = \sqrt{d_x(x,y)^2 + d_y(x,y)^2},$$

where $d_x(x, y) = p(x+1, y) - p(x, y)$ and $d_y(x, y) = p(x, y+1) - p(x, y)$.

C) Pixel histogram feature.

The pixels within the region corresponding to a text line sample are statistically analyzed such that the pixels are divided into 8 range segments according to the pixel values. Each range segment includes 32 pixel tones. The number of pixels in the range segments is identified as the features, which are output features of 8 dimensions.

D) Pixel variance feature.

In this exemplary embodiment, the pixel variance feature can be extracted by two exemplary approaches. First, with the projecting method, a main axis direction of a text line sample is computed. Based on the main axis direction, the text region is divided into areas in the configuration of a shape of '⊞', each area of which the number of pixels and variances are computed for the continuous regions. Second, with a horizontal baseline, the difference between pixels where the baseline passes through (e.g., $d_x$) is computed; and the number of $d_x$ greater than 0 is statistically analyzed.

Further, the continuous regions of the text line samples and marked up samples are obtained, the features of which are also extracted. In particular, for the text line samples, a threshold based binarizing can be utilized to obtain the continuous regions. For the marked up samples, maximally stable extremal regions (MSER) algorithms or the improved MSER algorithms can be utilized to extract the continuous regions, after which the stroke width transform (SWT) algorithms or the stroke feature transform (SFT) algorithms can be utilized to compute the stroke width for the continuous regions. A mean value for the stroke width, a minimal value for the stroke width, a maximal value for the stroke width as well as a variance of the stroke width can be obtained. Furthermore, the number of the turning points and the holes within each continuous region can also be computed.

The SFT algorithms used are improved SFT algorithms. Compared with the SWT algorithms, the SFT algorithms introduce color channels, increase edge constraint mechanism, and enhance robustness against background noises. The present disclosure generates text line samples by use of font reservoirs instead of manually marked up samples. Features extracted also differ from the currently available technologies, for example, the present disclosure provides for extracting at least two features, e.g., a group of features, to facilitate the generation of the text line classifiers.

It should be appreciated by one with ordinary skill of the art that, in addition to the above described approaches to extract features, other approaches such as feature learning processes of the convolutional neural networks (CNNs) can also be utilized for feature extraction.

In step S204, the extracted features are utilized for model training. The BP neural network can be utilized to generate models corresponding to the text line samples based upon the extracted features. In other words, the number of generated models is the same as the number of types of the text line samples.

In step S205, weights are assigned to the models by combinational use of pre-stored marked up samples to generate text line classifiers. In this embodiment, first a weight is assigned to the generated multiple models, then the marked up samples are utilized to modify the weights assigned to the models to generate the text line classifiers.

Figure 3:
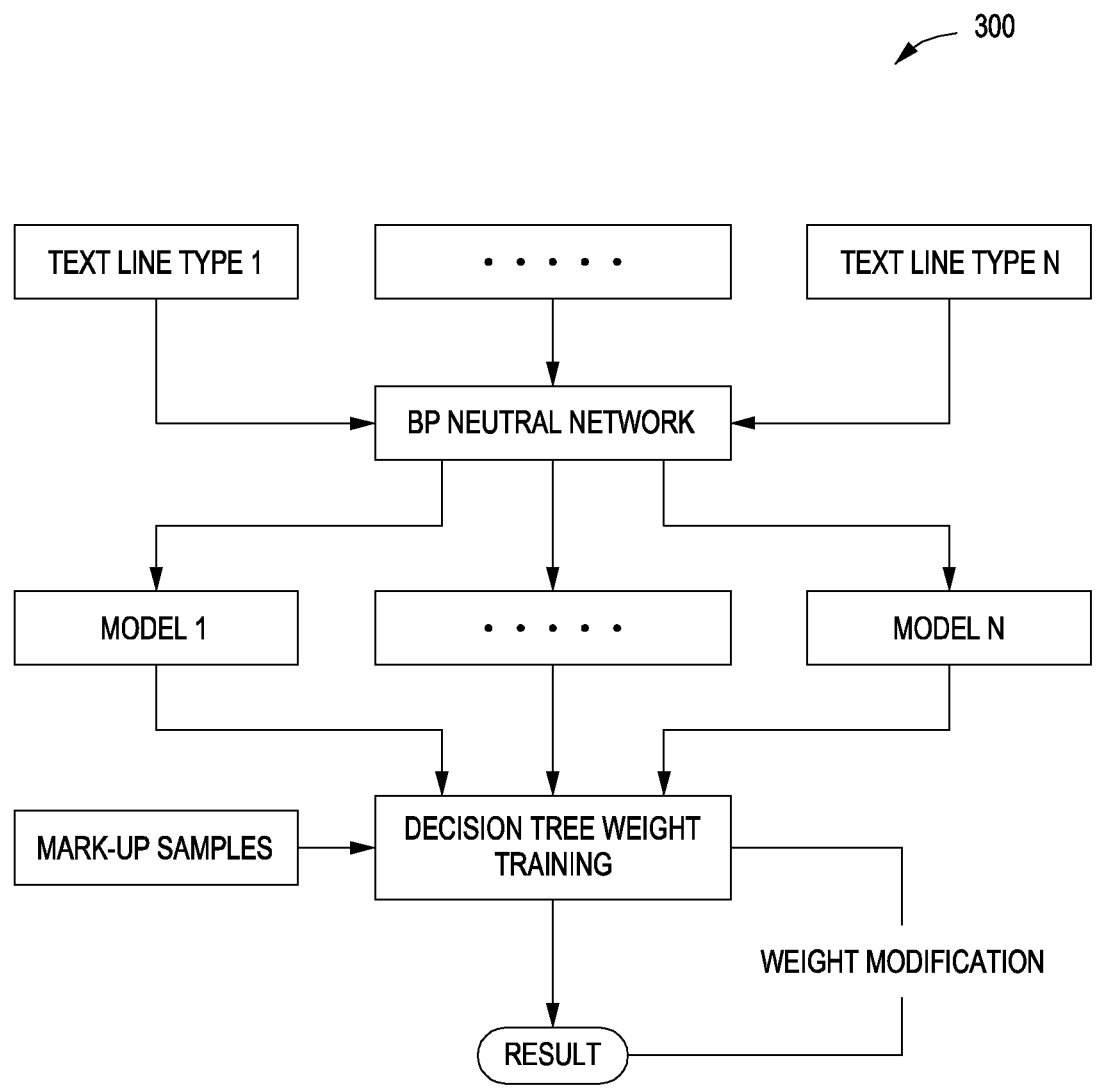
FIG. 3 is a flow chart of an exemplary method of feature training by use of a BP neural network in accordance with an embodiment of the present disclosure.

Referring to FIG. 3, a flow chart of an exemplary method of feature training by use of a BP neural network is shown in accordance with an embodiment of the present disclosure. In method 300, the models are trained based on the extracted features and the text line classifiers are generated (e.g., the steps of S204 and S205). The BP neural network is utilized for training the extracted features. The BP network is configured with an input layer of feature dimensions 64 and a hidden layer 128. Each type of the text line sample outputs one model upon training.

In one example, after the training, N number of models are generated, each model individually output as a decision tree classifier, each model having an initial weight of 1/N. Then, with the marked up samples, weight training can be conducted. For each classification, if there is an error in classification, the weight of the correspondent decision tree classifier is subtracted from the output value of the classifier. If the classification is correct, the weight of the correspondent decision tree classifier is augmented with output value of the classifier. Lastly, the weights of the classifiers are normalized such that the sum of the weights equals 1. With a process as shown in FIG. 3, appropriate weights can be assigned to multiple models generated to enhance the classification accuracy by the classifiers.

Figure 4:
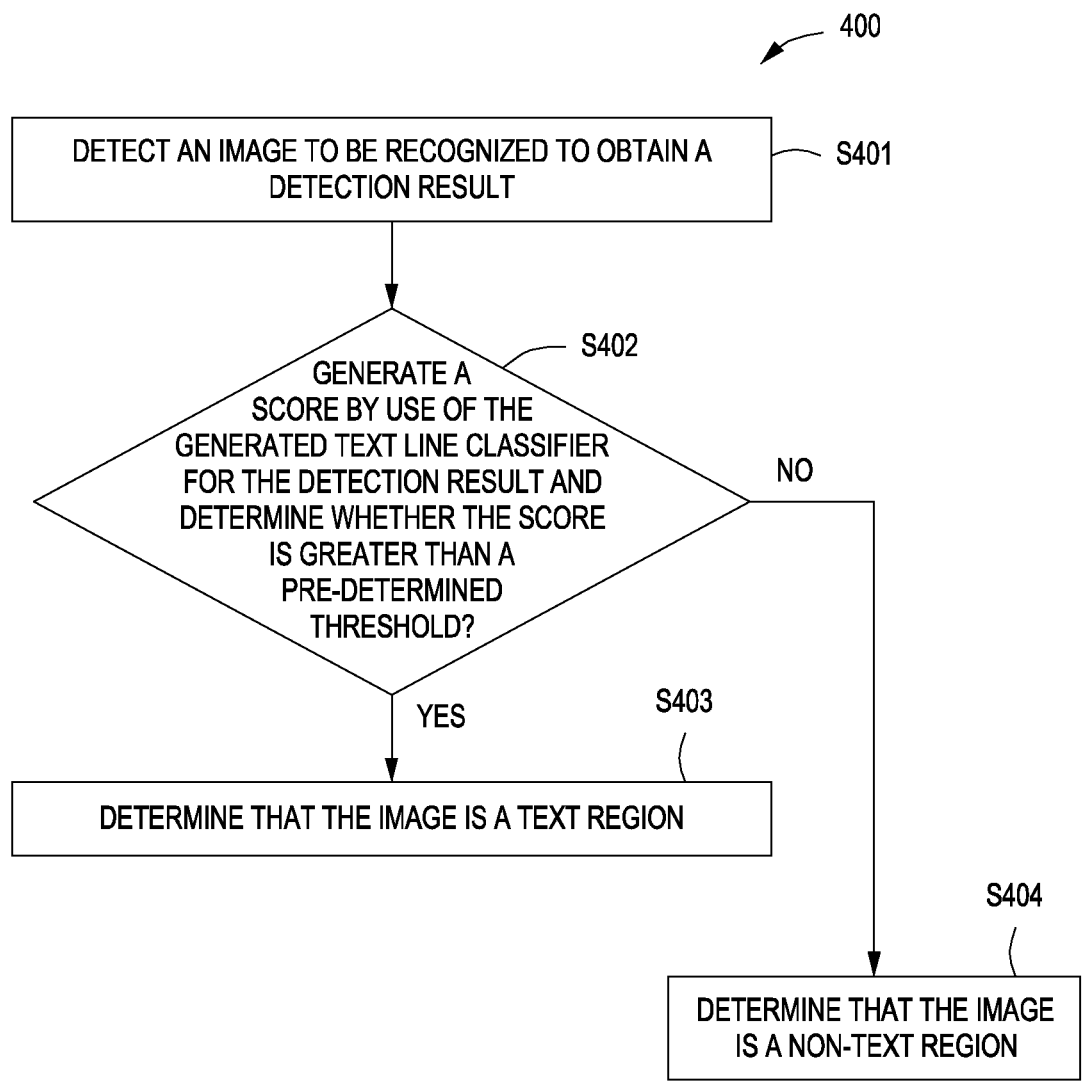
FIG. 4 is a flow chart of another exemplary method of recognizing text regions in accordance with an embodiment of the present disclosure.

Referring to FIG. 4, a flow chart of an exemplary method of recognizing text regions is shown in accordance with embodiments of the present disclosure. Method 400 starts in step S401, where pictures or images that are candidates for recognition are detected to generate a detection result. In particular, the candidate pictures or images for recognition can be analyzed with OCR to generate a detection result.

In step S402, a score is output by use of a text line classifier for the detection result. In step S403, if the score is greater than a pre-determined threshold, it is determined that the candidate picture or image is a text region. In step 5404, if the score is less than a pre-determined threshold, it is determined that the candidate picture or image is a non-text region. In particular, the detection results can be input to a text line classifier generated by the exemplary method as illustrated in FIG. 2A. The text line classifier outputs a score, the higher the score the higher the possibility that the candidate picture or image is a text region. Alternatively, experience can be utilized to configure a threshold value. If the score is greater than the threshold value, the candidate picture or image is determined to be a text region. Otherwise, the candidate picture or image is determined to be a non-text region. After determining that the candidate picture or image is a text region, it can be further analyzed to recognize the texts in the picture to determine whether they are prohibited texts.

Because the text line classifier generated by the exemplary method as illustrated in FIG. 2A can target different scenes and different requirements for text region recognition, it provides for a high degree of applicability and wide application in addition to ease of implementation. Together with the combinational use of the marked up samples for extracting features from the text line samples, the text line classifiers generated provide for enhanced classification efficiency and accuracy. Therefore, the text line classifiers generated by use of the exemplary method of FIG. 2A can recognize in different scenes whether a picture is a text region in a simple, effective and accurate manner. Consequently, it further recognizes whether the corresponding pictures include prohibited texts and provides basis for how to process those pictures.

Figure 5:
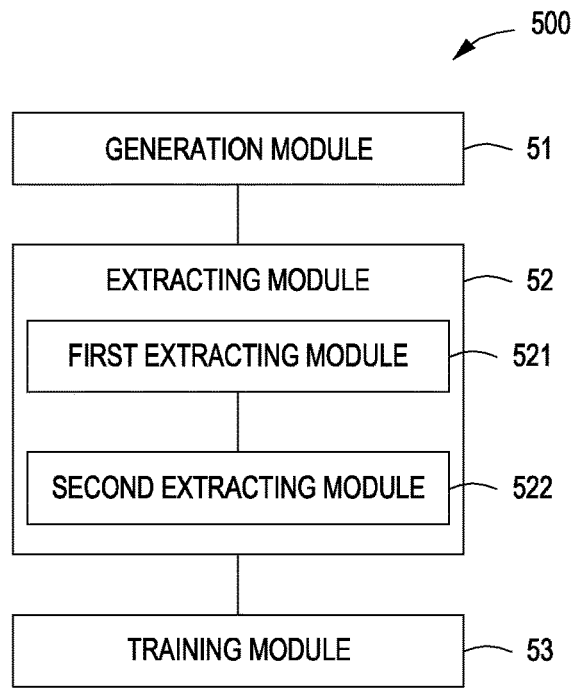
FIG. 5 is a block diagram of an exemplary apparatus for generating text line classifiers in accordance with an embodiment of the present disclosure.

Referring to FIG. 5, a block diagram of an exemplary apparatus for generating text line classifiers is shown in accordance with embodiments of the present disclosure. The apparatus 500 includes a generating module 51, an extracting module 52 and a training module 53. The generating module is configured to generate text line samples by use of a present terminal system font reservoir. The extracting module is configured to extract features from the text line samples and pre-stored marked-up samples. The training module is configured to train models by use of the extracted features to generate a text line classifier for recognizing text regions.

In particular, the generating module 51 is configured to generate samples of characters by use of the present terminal system font reservoir, after which the samples of characters are further processed to generate various types of text line samples. The process of generating character samples by use of the present terminal system font reservoir includes obtaining characters of different fonts from the font reservoir, and introducing spacing distance, rotation angles, size, noise and the like (disturbance) to generate character samples. The further processing of the character samples to generate text line samples includes randomly arranging characters of the same font together, followed by adding disturbance to generate text line samples of different types.

In further details, the generating of character samples includes the steps where: 1) a single character is obtained from a font reservoir, which can be the Windows™ system's embedded fonts, the Founder fonts, and/or the handwritten fonts, etc.; and 2) each Chinese character is selected in 21 sizes, e.g., {5,5.5,6,6.5,7,7.5,8,9,10,10.5,11,12,14,16,18,20, 22,24,26,28,36,48,72} (pounds); and 3) each Chinese character is subject to slanting distortion and non-distortion; and 4) each Chinese character is disturbed by rotation degrees of from about −10° to about 10°.

The generating of text line samples by use of the above described character samples includes the following steps: 1) each text line reserves about from 5 pixels to about 10 pixels in the edge gap; 2) each character in each text line is distanced with a gap of $\{1,2, \ldots , 10\}/10$ of a width of a Chinese character; 3) each text line includes a number of from about 2 to about 10 Chinese characters; 4) each text line is classified into the categories of horizontal text, vertical text, oblique text of a 45° and oblique text of a −45°; 5) each text line is introduced a rotation of from −10° degrees to about 10° degrees; and 6) each text line is processed by multiple groups of Gaussian low-pass filters for blurring or smoothing. With the above described steps, text line samples are generated accordingly. However, further limitations can be met by the generated text line samples. For example, each text line contains Chinese characters of the same size; each sample text line contains Chinese characters of the same rotation angles; each sample text line contains Chinese characters of either the oblique style or the non-oblique style; each sample text line contains Chinese characters of the same font; and each sample text line contains commonly used Chinese characters in a percentage of, for example, above 80%.

Prior to the extracting module 52 extracting features from the text line samples and the pre-stored marked up samples, the marked up samples are recorded. In particular, the process of manually marking up the sample includes the steps of utilizing detection algorithms to dissect candidate text regions, and manually marking up the candidate text regions, for example, as either 1 or 0 to indicate whether the region is a text region.

The extracting module 52 includes a first extracting module 521 and a second extracting module 522 for purposes of extracting sample features. The first extracting module is configured to extract, from images corresponding to the text line samples, one or more of a gradient orientation histogram feature, a gradient magnitude histogram feature, a pixel histogram feature, and a pixel histogram change feature. The second extracting module is configured to obtain continuous regions of the text line samples and the marked-up samples and to extract features of the continuous regions.

In particular, the pertinent details of the feature extracting by the first extracting module 511 and the second extracting module 522 are substantially similar as illustrated in the corresponding process of step S203 of FIG. 2A. The details are not repeated here for the purposes of simplicity.

The training module 53 is configured to generate models corresponding to the types of the text line samples based on the extracted features and to assign weights to the models based on the marked up samples to generate a text line classifier. In particular, a back propagation (BP) neural network is utilized for single model training by use of the extracted features. Since each type of text line samples can train a correspondent model, various types of text line samples train various models, each model can be designated as a decision tree. In the beginning, a weight is assigned for each decision tree, then the weight training is performed for the decision trees by use of a portion of the marked up samples such that each decision tree is assigned an appropriate weight to assure the accuracy of the classification. With the above described process, text line classifiers can be generated in accordance with the pertinent details substantially similar as illustrated in FIG. 3.

Since the system font reservoir is utilized for generating text line samples instead of utilizing a large amount of samples manually marked up, the generated training samples have more thorough coverage for targeting different scenes or different requirements for text region recognition with a high degree of applicability. Together with the combinational use of the marked up samples for extracting features from the text line samples, the generated text line classifiers provide for enhanced classification efficiency and accuracy.

Figure 6:
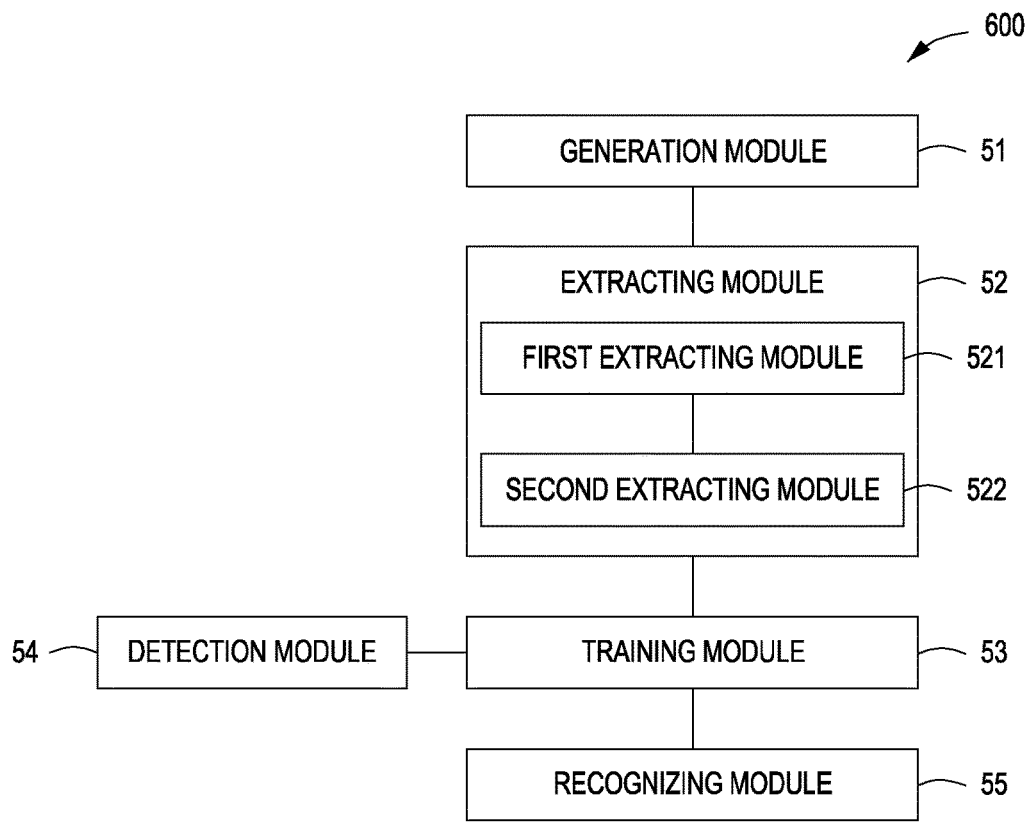
FIG. 6 is a block diagram of another exemplary apparatus for generating text line classifiers in accordance with an embodiment of the present disclosure.

Referring to FIG. 6, a block diagram of another exemplary apparatus for generating text line classifiers is shown in accordance with an embodiment of the present disclosure. The apparatus 600 further includes a detection module 54 and a recognizing module 55. The detection module 54 is configured to detect an image to be recognized to obtain a detection result. The recognizing module 55 is configured to generate a score by use of the generated text line classifier for the detection result, where the recognition module determines that the image is a text region if the score is greater than a pre-determined threshold; and the recognition module determines that the image is a non-text region if the score is less than a pre-determined threshold. After the image is determined to be a text region, texts included in the image are further recognized to determine whether the image contains any prohibited text.

The text line classifier generated by the generating module 51, the extracting module 52 and the training module 53 can target different scenes and different requirements for text region recognition, it provides for a high degree of applicability and wide application in addition to ease of implementation. Together with the combinational use of the marked up samples for extracting features from the text line samples, the generated text line classifiers provide for enhanced classification efficiency and accuracy. Therefore, the text line classifiers generated by use of the exemplary apparatus can recognize, in different scenes, whether a picture is a text region in a simple, effective and accurate manner. Consequently, it further recognizes whether the corresponding pictures include prohibited texts and provides a basis for how to process those pictures.

Since the above described exemplary apparatus utilizes the generating module to generate text line samples, the generated text line classifiers can target different scenes or different requirements for text region recognition with a high degree of applicability and wide application in addition to ease of implementation. Together with the combinational use of the marked up samples for extracting features from the text line samples, the generated text line classifiers provide for enhanced accuracy in classification.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is appreciated that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not necessary functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations have any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of generating a text line classifier for recognizing text regions in an image, the method comprising:
   generating a plurality of lines of text characters, a number of text characters in a line of text characters being variations of text characters in a font reservoir, generating the plurality of lines of text characters to include:
      selecting a plurality of text characters from the font reservoir;
      varying an aspect of the plurality of text characters to form a plurality of character samples;
      randomly arranging a number of character samples from the plurality of character samples to form a line of character samples; and
      varying an aspect of the line of character samples to form a line of text characters; and
   generating a plurality of pre-stored marked-up samples;
   extracting a plurality of features from the plurality of lines of text characters and the plurality of pre-stored marked-up samples; and
   training a plurality of models using the plurality of extracted features to generate the text line classifier.

2. The method of claim 1, wherein training the plurality of models includes:
   generating type models corresponding to types of the line of text characters based on the extracted features; and
   assigning weights to the type models based on the pre-stored marked-up samples to generate the text line classifier.

3. A method of recognizing text regions in an image, the method comprising:
   selecting a plurality of characters from a font reservoir;
   generating a line of text based on the plurality of characters, generating the line of text to include:
      modifying the plurality of characters to form a plurality of modified characters; and
      arranging a number of modified characters of the plurality of modified characters to form a line of modified characters;
   extracting a plurality of features from the line of text;
   representing the plurality of features extracted from the line of text as a first vector;
   training a model utilizing the first vector to obtain a trained model;
   detecting an image to be recognized;
   determining a second vector from the image;
   inputting the second vector into the trained model, the trained model generating a score;

determining that the image to be recognized is a text region if the score is greater than a pre-determined threshold; and determining that the image to be recognized is a non-text region if the score is less than the pre-determined threshold.

4. A method of generating a text line classifier, the method comprising:

selecting a plurality of text characters from a font reservoir;

varying an aspect of the plurality of text characters to form a plurality of character samples;

randomly arranging a number of character samples from the plurality of character samples to form a line of character samples;

varying an aspect of the line of character samples to form a line of text characters; and extracting from the line of text characters one or more of a gradient orientation histogram feature, a gradient magnitude histogram feature, a pixel histogram feature, and a pixel histogram change feature.

5. The method of claim 4, wherein:

a number of text characters of the plurality of text characters differ only in that the number of text characters has a different font; and the font reservoir includes Asian characters.

6. The method of claim 4, wherein:

the text characters in the line of text characters have a same size, a same rotation angle, and a same font; and more than half of the text characters in the line of text characters are commonly used characters.

7. The method of claim 4, wherein extracting includes:

obtaining continuous regions of the line of text characters; and extracting features of the continuous regions.

8. The method of claim 4, further comprising, generating a model corresponding to a type of the line of text characters based on the extracted features.

9. A non-transitory computer-readable storage medium having embedded therein program instructions, which when executed by one or more processors of a device, causes the device to execute a process that generates a text line classifier for recognizing text regions in an image, the process comprising:

generating a plurality of lines of text characters, a number of text characters in a line of text characters being variations of text characters in a font reservoir, generating the plurality of lines of text characters to include:

selecting a plurality of text characters from the font reservoir;

varying an aspect of the plurality of text characters to form a plurality of character samples;

randomly arranging a number of character samples from the plurality of character samples to form a line of character samples; and varying an aspect of the line of character samples to form a line of text characters; and generating a plurality of pre-stored marked-up samples;

extracting a plurality of features from the plurality of lines of text characters and the pre-stored marked-up samples; and training a plurality of models using the plurality of extracted features to generate the text line classifier.

10. The non-transitory computer-readable storage medium of claim 9, wherein training the plurality of models includes:

generating type models corresponding to types of the line of text characters based on the extracted features; and assigning weights to the type models based on the pre-stored marked-up samples to generate the text line classifier.

11. A non-transitory computer-readable storage medium having embedded therein program instructions, which when executed by one or more processors of a device, causes the device to execute a process that recognizes text regions in an image, the process comprising:

selecting a plurality of characters from a font reservoir;

generating a line of text based on the plurality of characters, generating the line of text to include:

modifying the plurality of characters to form a plurality of modified characters; and arranging a number of modified characters of the plurality of modified characters to form a line of modified characters;

extracting a plurality of features from the line of text;

representing the plurality of features extracted from the line of text as a first vector;

training a model utilizing the first vector to obtain a trained model;

detecting an image to be recognized;

determining a second vector from the image;

inputting the second vector into the trained model, the trained model generating a score;

determining that the image to be recognized is a text region if the score is greater than a pre-determined threshold; and determining that the image to be recognized is a non-text region if the score is less than the pre-determined threshold.

\* \* \* \* \*